(12) United States Patent
Jung et al.

(10) Patent No.: US 11,798,274 B2
(45) Date of Patent: Oct. 24, 2023

(54) METHOD AND SYSTEM FOR CROWDSOURCING GEOFENCING-BASED CONTENT

(71) Applicant: NAVER LABS CORPORATION, Seongnam-si (KR)

(72) Inventors: Jeanie Jung, Seongnam-si (KR); Byungsoo Kim, Seongnam-si (KR)

(73) Assignee: NAVER LABS CORPORATION, Seongnam-si (KR)

( * ) Notice: Subject to any disclaimer, the term of this patent is extended or adjusted under 35 U.S.C. 154(b) by 175 days.

(21) Appl. No.: 16/903,953

(22) Filed: Jun. 17, 2020

(65) Prior Publication Data

US 2020/0320300 A1  Oct. 8, 2020

Related U.S. Application Data

(63) Continuation of application No. PCT/KR2018/015672, filed on Dec. 11, 2018.

(30) Foreign Application Priority Data

Dec. 18, 2017 (KR) .................. 10-2017-0174279
Dec. 18, 2017 (KR) .................. 10-2017-0174280

(51) Int. Cl.
*G09G 5/00* (2006.01)
*G06V 20/20* (2022.01)
(Continued)

(52) U.S. Cl.
CPC ............. *G06V 20/20* (2022.01); *G06Q 50/01* (2013.01); *H04W 4/021* (2013.01); *H04W 4/023* (2013.01); *H04W 4/12* (2013.01)

(58) Field of Classification Search
CPC .... G06K 9/00671; G06Q 50/01; G06Q 30/02; G06Q 30/06; G06Q 30/08; G06Q 50/30;
(Continued)

(56) References Cited

U.S. PATENT DOCUMENTS 10,105,601 B1 * 10/2018 Hariton .................. A63F 13/52
10,255,794 B1   4/2019 Merjanian et al.
(Continued)

FOREIGN PATENT DOCUMENTS

KR   1020050105572 A   11/2005
KR   1020070107275 A   11/2007
(Continued)

OTHER PUBLICATIONS

ISR issued in Int'l. Application No. PCT/KR2018/015672, dated Mar. 18, 2019.
Jung, Jeanie, U.S. Appl. No. 16/900,177, filed Jun. 12, 2020.

*Primary Examiner* — Suraj M Joshi
*Assistant Examiner* — Hao H Nguyen
(74) *Attorney, Agent, or Firm* — Greer Burns & Crain Ltd.

(57) ABSTRACT

A method for spatial messaging includes the steps of setting, as a space for messaging, a location designated by a user as a virtual space assigned a unique coordinate value corresponding to a location in the real world; and collecting, as a message for the space, at least one content authored by another user who shares the corresponding space through a coordinate value of the space.

18 Claims, 19 Drawing Sheets

(51) Int. Cl.
*G06Q 50/00* (2012.01)
*H04W 4/021* (2018.01)
*H04W 4/02* (2018.01)
*H04W 4/12* (2009.01)

(58) Field of Classification Search
CPC .. G06Q 30/0246; H04W 4/021; H04W 4/023; H04W 4/12; H04W 4/02; H04W 4/21; H04L 51/20; H04L 51/32; H04L 67/18; H04L 51/08
See application file for complete search history.

(56) References Cited

U.S. PATENT DOCUMENTS

| | | | |
|---|---|---|---|
| 10,803,666 B1* | 10/2020 | Buerli | G06F 3/011 |
| 2014/0015858 A1* | 1/2014 | Chiu | G09G 5/14 |
| | | | 345/633 |
| 2014/0313225 A1* | 10/2014 | Lee | G03H 1/0005 |
| | | | 345/633 |
| 2015/0206349 A1* | 7/2015 | Rosenthal | H04N 5/232935 |
| | | | 345/633 |
| 2016/0195403 A1* | 7/2016 | Tuukkanen | G01C 21/3423 |
| | | | 701/533 |
| 2017/0078853 A1* | 3/2017 | Park | H04L 67/18 |
| 2017/0243403 A1 | 8/2017 | Daniels et al. | |
| 2017/0372525 A1 | 12/2017 | Rosenthal et al. | |
| 2018/0047213 A1* | 2/2018 | Woo | G06T 19/006 |
| 2018/0063684 A1* | 3/2018 | Cheng | H04W 4/02 |
| 2018/0096450 A1 | 4/2018 | Monk et al. | |
| 2018/0124148 A1* | 5/2018 | Boudville | A63F 13/213 |
| 2018/0253900 A1* | 9/2018 | Finding | G02B 27/017 |
| 2018/0349413 A1* | 12/2018 | Shelby | G01C 21/3638 |
| 2018/0350144 A1* | 12/2018 | Rathod | G06Q 20/3224 |
| 2019/0321723 A1* | 10/2019 | Fuchs | A63F 13/216 |
| 2020/0246699 A1 | 8/2020 | Hariton | |
| 2020/0314046 A1 | 10/2020 | Jung | |
| 2020/0334906 A9 | 10/2020 | Mott et al. | |
| 2020/0394847 A1 | 12/2020 | Buerli et al. | |

FOREIGN PATENT DOCUMENTS

| | | |
|---|---|---|
| KR | 1020090018656 A | 2/2009 |
| KR | 1020100022428 A | 3/2010 |
| KR | 1020100136043 A | 12/2010 |
| KR | 101069343 B1 | 9/2011 |
| KR | 101106939 B1 | 1/2012 |
| KR | 101525936 B1 | 5/2015 |
| KR | 1020160096546 A | 8/2016 |
| KR | 1020160112898 A | 9/2016 |
| KR | 1020170018930 A | 2/2017 |
| KR | 101720132 B1 | 3/2017 |

\* cited by examiner

| Location coordinates (701) | Unique coordinate value (702) |
|---|---|
| x1, y1, z1 | url_111 |
| x2, y2, z2 | url_222 |
| x3, y3, z3 | url_333 |
| x4, y4, z4 | url_444 |
| ... | ... |

900

1600

METHOD AND SYSTEM FOR CROWDSOURCING GEOFENCING-BASED CONTENT

CROSS-REFERENCE TO RELATED APPLICATIONS

This is a continuation application of International Application No. PCT/KR2018/015672, filed Dec. 11, 2018, which claims the benefit of Korean Patent Application Nos. 10-2017-0174279, filed Dec. 18, 2017 and 10-2017-0174280, filed Dec. 18, 2017.

BACKGROUND OF THE INVENTION

Field of Invention

Example embodiments of the following description relate to technology for crowdsourcing geofencing-based content.

Description of Related Art

Currently, efforts have been made to provide a variety of services by applying augmented reality (AR).

For example, technology for providing an AR experience function capable of actually demonstrating a product when shopping is disclosed in Korean Patent Laid-Open Publication NO. 10-2016-0096546 (published on Aug. 16, 2016).

With the development in such AR-based technology, space has emerged as a next-generation computing system, but the simple augmentation of content is merely to provide momentary fun and events.

BRIEF SUMMARY OF THE INVENTION

One or more example embodiments of the present invention provide a method and system for proposing a space-based social communication and crowdsourcing a message through a corresponding space.

One or more example embodiments also provide a method for preoccupying or occupying a specific point through localization and digitization of a three-dimensional (3D) space for the real world.

One or more example embodiments also provide a business model for charging for and selling a virtual space for messaging and sharing.

According to at least one example embodiment, there is provided a method performed by a computer system, the method including setting, as a space for messaging, a location designated by a user as a virtual space to which a unique coordinate value corresponding to a location in the real world is assigned; and collecting, as a message for the space, at least one piece of content authored by another user that shares the corresponding space through a coordinate value of the space.

According to an aspect of the present invention, the setting may include providing a user interface (UI) for location designation using a map to set, as the space for messaging, a location designated on the map through the UI or to set, as the space for messaging, a location specified by an electronic device of the user in an augmented reality (AR)-based service environment.

According to another aspect, the setting may include setting a messaging condition that includes at least one of a content type attachable to the space, a sharing target range for the space, a messaging goal of the space, and a content custom asset attachable to the space, and the collecting may include collecting content corresponding to the messaging condition with respect to another user that shares the corresponding space through the coordinate value of the space.

According to still another aspect, the collecting may include providing a content authoring function for the space in response to specifying the location designated as the space in an AR-based service environment, and collecting content authored through the content authoring function as a message of the corresponding space, and providing a content authoring function for the space in response to using a map that includes the location designated as the space through a map service on a web, and collecting content authored through the content authoring function as a message of the corresponding space.

According to still another aspect, the method may further include sharing the content collected in the corresponding space through the coordinate value of the space.

According to still another aspect, the sharing may include providing the content collected in the corresponding space based on the coordinate value of the space as content on a web using a coordinate system.

According to still another aspect, the sharing may include providing, as AR content, the content collected in the corresponding space on an AR space that includes the space.

According to still another aspect, the sharing may include sharing the content collected in the corresponding space through interaction with a community related to the space.

According to still another aspect, the sharing may include selecting and displaying a portion of contents collected in the corresponding space based on at least one selection criterion among a category, an up-to-date feature, and a popularity of content, a number of contents requested, and a search condition for the space.

According to still another aspect, the sharing may include providing an interaction corresponding to a condition associated with at least one of the characteristics of the location designated as the space, the access distance for the space, and the content collected in the space.

According to still another aspect, the method may further include registering the space as an auction point; and managing content on the space by granting a preoccupancy authority according to an auction option for the space.

According to still another aspect, the registering may include registering a corresponding point as the auction point in response to the space being created at a location of a predesignated point or in response to the space being created at a location of a point selected as a search characteristic.

According to still another aspect, the registering may include registering at least a portion of the space as the auction point based on a number of contents linked on the space.

According to still another aspect, the method may further include determining an auction option that includes at least one of a selling price and an occupancy period for the auction point.

According to still another aspect, the method may further include calculating a grade of a corresponding point based on a popularity of the auction point and determining an auction option that includes at least one of a selling price and an occupancy period corresponding to the calculated grade.

According to still another aspect, the managing may include granting the preoccupancy authority of the space to a target that accepts the auction option and displaying at least one of content linked by the target and content related to the target through the space.

According to still another aspect, the managing may include setting at least one of a condition of content linkable to the space by a target having the preoccupancy authority of the space, a condition of a user capable of linking content to the space, a content display condition of content displayed through the space, and a condition of an event provided through the space; and managing the content on the space based on the set condition.

According to at least one example embodiment, there is provided a non-transitory computer-readable record medium storing a program to computer-implement the information sharing method.

According to at least one example embodiment, there is provided a computer system including at least one processor configured to execute computer-readable instructions included in a memory. The at least one processor includes a space setter configured to set, as a space for messaging, a location designated by a user as a virtual space to which a unique coordinate value corresponding to a location in the real world is assigned; and a messaging processing configured to collect, as a message for the space, at least one piece of content authored by another user that shares the corresponding space through a coordinate value of the space.

According to at least one example embodiment, there is provided a computer system including at least one processor configured to execute computer-readable instructions included in a memory. The at least one processor includes a point register configured to register, as an auction point, a space to which a unique coordinate value corresponding to a location in the real world is assigned; an option determiner configured to determine an auction option for the space; and a space manager configured to manage content on the space by granting a preoccupancy authority according to the auction option for the space.

According to some example embodiments, it is possible to configure a space as a social messaging system by proposing a space-based social communication.

According to some example embodiments, it is possible to perform crowdsourcing and archiving of geofencing-based augmented reality (AR) content through a space.

According to some example embodiments, it is possible implement space occupied marketing through localization and digitization of a three-dimensional (3D) space for the real world.

According to some example embodiments, it is possible to induce competition for occupancy of a space by setting an occupancy period and by selling a virtual space available for marketing through messaging and sharing based on the set occupancy period.

BRIEF DESCRIPTION OF DRAWINGS

FIGS. 5 to 7 illustrate examples of a process of coordinating a space according to an example embodiment.

DETAILED DESCRIPTION OF THE INVENTION

Hereinafter, example embodiments will be described with reference to the accompanying drawings.

An information sharing method according to example embodiments may be performed through a computer apparatus, such as an electronic device or a server, which is described below. Here, a computer program according to example embodiments may be installed and executed on the computer apparatus, and the computer apparatus may perform the information sharing method according to the example embodiments under control of the executed computer program. The computer program may be stored in a non-transitory computer-readable recording medium to perform the information sharing method on a computer in conjunction with the computer apparatus. For example, the server may serve as an information platform for information sharing, and particularly, may share augmented reality (AR) content with users by creating a virtual space having a unique coordinate value and by linking the AR content to the corresponding space.

Figure 1:
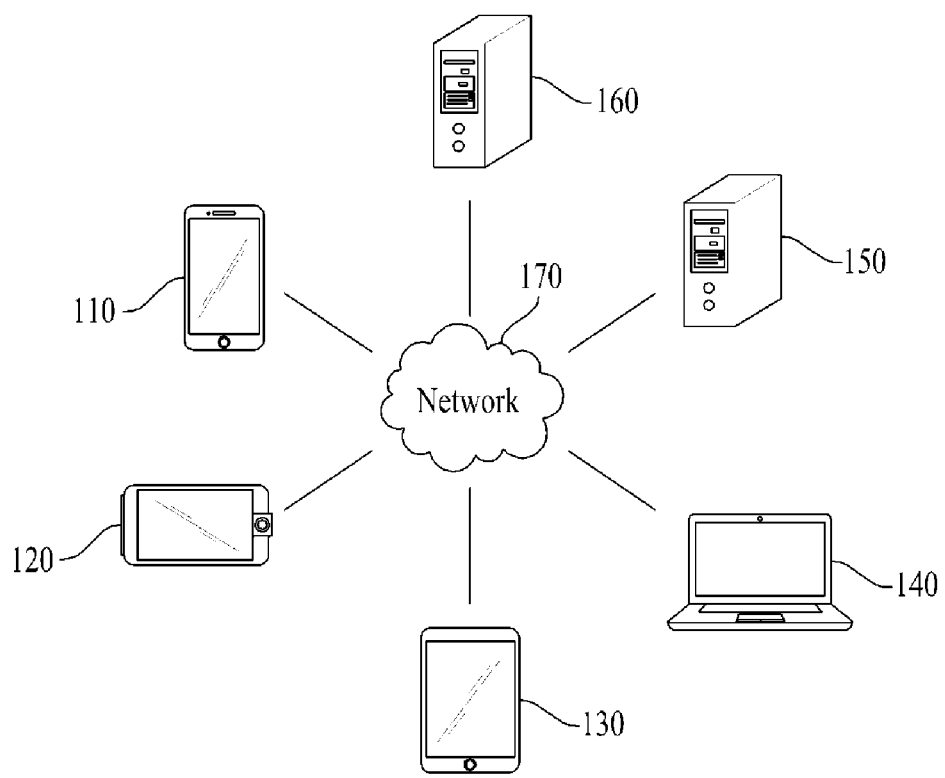
FIG. 1 is a diagram illustrating an example of a network environment according to an example embodiment.

FIG. 1 is a diagram illustrating an example of a network environment according to at least one example embodiment. Referring to FIG. 1, the network environment includes a plurality of electronic devices 110, 120, 130, 140, a plurality of servers 150, 160, and a network 170. FIG. 1 is provided as an example only and thus, a number of electronic devices or a number of servers are not limited thereto.

Each of the plurality of electronic devices 110, 120, 130, 140 may be a fixed terminal or a mobile terminal configured as a computer apparatus. For example, the plurality of electronic devices 110, 120, 130, 140 may be a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an AR device, and the like. For example, although FIG. 1 illustrates a shape of a smartphone as an example of the electronic device 1 110, the electronic device 1 110 may refer to one of various physical computer apparatuses capable of communicating with other electronic devices 120, 130, 140, and/or the servers 150, 160 over the network 170 in a wireless communication manner or in a wired communication manner.

The communication scheme is not particularly limited and may include a communication method using a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, these are provided as examples only and the example embodiments are not limited thereto.

Each of the servers 150, 160 may be configured as a computer apparatus or a plurality of computer apparatuses that provides instructions, codes, files, contents, services, and the like, through communication with the plurality of electronic devices 110, 120, 130, 140 over the network 170. For example, the server 150 may be a system that provides a first service to the plurality of electronic devices 110, 120, 130, 140 connected over the network 170. The server 160 may be a system that provides a second service to the plurality of electronic devices 110, 120, 130, 140 connected over the network 170. In detail, for example, the server 150 may provide a service, for example, an information sharing service, desired by a corresponding application to the plurality of electronic devices 110, 120, 130, 140, as the first service through the application as a computer program installed and executed on the plurality of electronic devices 110, 120, 130, 140. As another example, the server 160 may provide, as the second service, a service that distributes a file for installing and executing the application to the plurality of electronic devices 110, 120, 130, 140.

Figure 2:
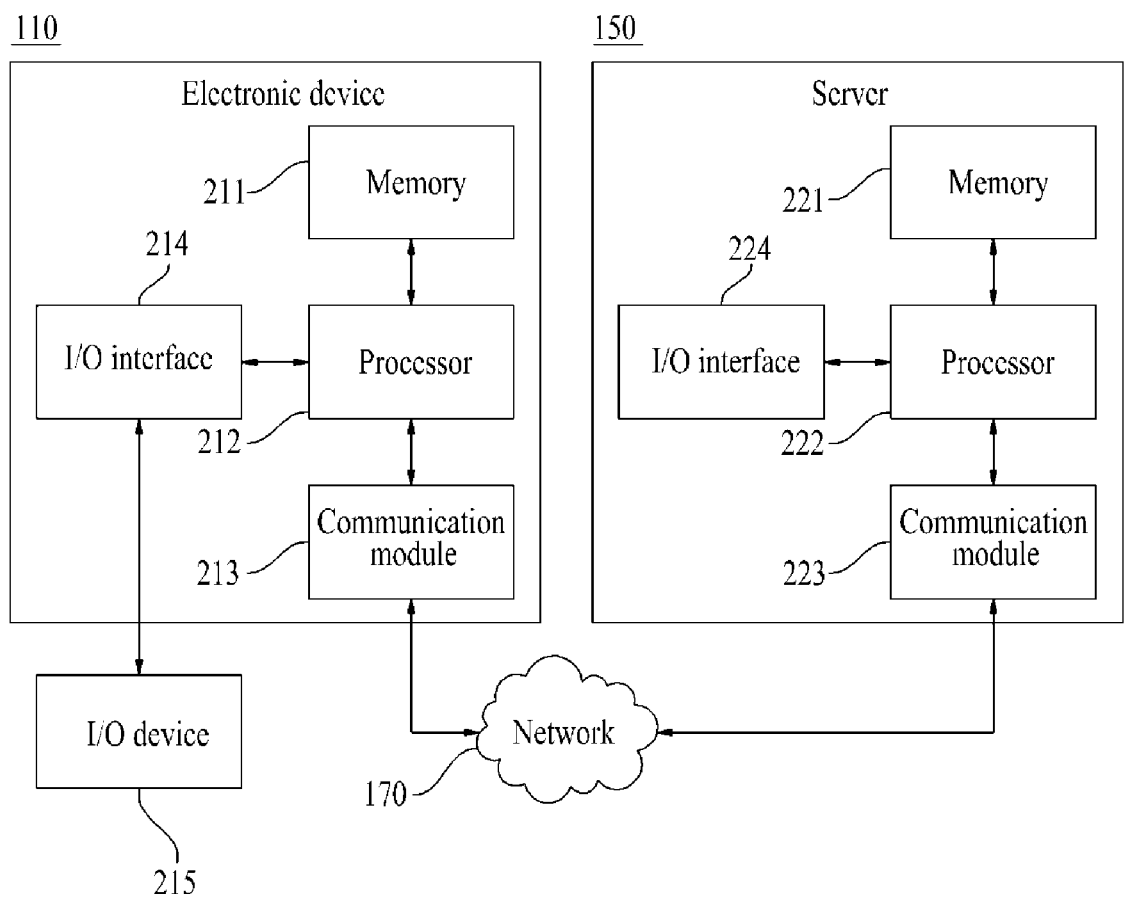
FIG. 2 is a block diagram illustrating a configuration of an electronic device and a server according to an example embodiment.

FIG. 2 is a block diagram illustrating an example of an electronic device and a server according to at least one example embodiment. FIG. 2 illustrates a configuration of the electronic device 1 110 as an example for a single electronic device and illustrates a configuration of the server 150 as an example for a single server. The same or similar components may be applicable to other electronic devices 120, 130, 140, or the server 160.

Referring to FIG. 2, the electronic device 1 110 may include a memory 211, a processor 212, a communication module 213, and an input/output (I/O) interface 214, and the server 150 may include a memory 221, a processor 222, a communication module 223, and an I/O interface 224. When the components with the common name in the electronic device 1 110 and the server 150 are described together as a single component, it should be understood that the description applies individually to both components respectively. The memory 211, 221 may include a permanent mass storage device, such as random access memory (RAM), a read only memory (ROM), a disk drive, a solid state drive (SSD), and a flash memory, as a non-transitory computer-readable record medium. The permanent mass storage device, such as ROM, SSD, flash memory, and disk drive, may be included in the electronic device 1 110 or the server 150 as a permanent storage device separate from the memory 211, 221. Also, an OS or at least one program code, for example, a code for a browser installed and executed on the electronic device 1 110 or an application installed and executed on the electronic device 1 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, which provides an installation file of the application.

The processor 212, 222 may be configured to process computer-readable instructions of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 1 110 and the server 150 over the network 170 and may provide a function for communication with another electronic device, for example, the electronic device 2 120 or another server, for example, the server 160. For example, the processor 212 of the electronic device 1 110 may transfer a request created based on a program code stored in the storage device, such as the memory 211, to the server 150 over the network 170 under the control of the communication module 213. Inversely, a control signal, an instruction, content, a file, etc., provided under the control of the processor 222 of the server 150 may be received at the electronic device 1 110 through the communication module 213 of the electronic device 1 110 by going through the communication module 223 and the network 170. For example, a control signal, an instruction, content, a file, etc., of the server 150 received through the communication module 213 may be transferred to the processor 212 or the memory 211, and content, a file, etc., may be stored in a record medium, for example, the permanent storage device, further includable in the electronic device 1 110.

The I/O interface 214 may be a device used for interfacing with an I/O device 215. For example, an input device of the I/O device 215 may include a device, such as a keyboard, a mouse, a microphone, and a camera, and an output device of the I/O device 215 may include a device, such as a display, a speaker, and a haptic feedback device. As another example, the I/O interface 214 may be a device for interfacing with an apparatus in which an input function and an output function are integrated into a single function, such as a touchscreen. The I/O device 215 may be configured as a single device with the electronic device 1 110. Also, the I/O interface 224 of the server 150 may be a device for interface with an apparatus (not shown) for input or output that may be connected to the server 150 or included in the server 150. In detail, when processing instructions of the computer program loaded to the memory 211, the processor 212 of the electronic device 1 110 may display a service screen configured using data provided from the server 150 or the electronic device 2 120, or may display content on a display through the I/O interface 214.

According to other example embodiments, the electronic device 1 110 and the server 150 may include a greater number of components than the number of components shown in FIG. 2. However, there is no need to clearly illustrate many components known in the related art. For example, the electronic device 1 110 may include at least a portion of the I/O device 215, or may further include other components, for example, a transceiver, a global positioning system (GPS) module, a camera, a variety of sensors, a database (DB), and the like. In detail, if the electronic device 1 110 is a smartphone, the electronic device 1 110 may be configured to further include a variety of components, for example, an accelerometer sensor, a gyro sensor, a camera module, various physical buttons, a button using a touch panel, an I/O port, a vibrator for vibration, etc., which are generally included in the smartphone.

Hereinafter, example embodiments of a method and a system for creating a space capable of linking AR content and making a communication through the space are described.

Here, proposed is a method of making space as an information platform by building a virtual wall through combination of AR and localization and by assigning a unique coordinate value for each individual location. A user may share content or a message of the user with another user through linkage to a specific three-dimensional (3D) space. Therefore, a universal global information system, such as a web, may be created by making a space of a real world as a virtual linkable space capable of linking a variety of information. Also, information on a specific space may be shared through interaction with the corresponding space and also a web or a mobile system, using the unique coordinate value.

Figure 3:
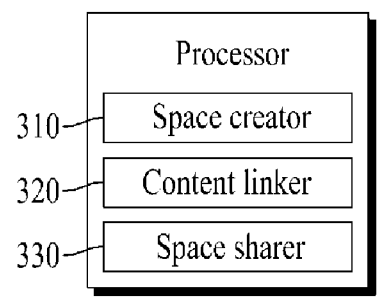
FIG. 3 is a block diagram illustrating an example of components includable in a processor of a server according to an example embodiment.
Figure 4:
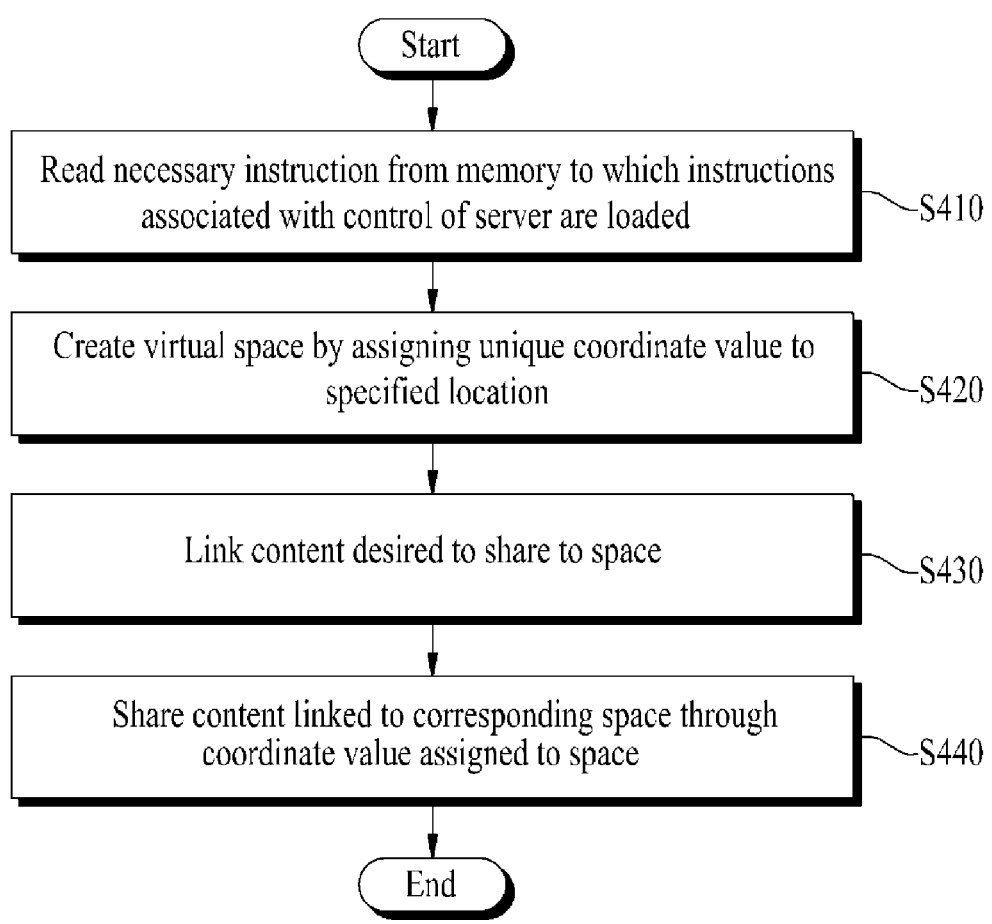
FIG. 4 is a flowchart illustrating an example of an information sharing method performed by a processor of a server according to an example embodiment.

FIG. 3 is a block diagram illustrating an example of components includable in the processor 222 of the server 150 according to an example embodiment, and FIG. 4 is a flowchart illustrating an example of a method performed by the processor 222 of the server 150 according to an example embodiment.

The server 150 according to the example embodiment may provide an information platform service for spatial messaging and content sharing through a combination of AR and localization. That is, the server 150 serves as a platform that provides the plurality of electronic devices that are clients with an information sharing service based on a space. The server 150 may provide the space-based information sharing service through interaction with an application installed on the electronic devices 110, 120, 130, 140.

Referring to FIG. 3, to perform the information sharing method of FIG. 4, the processor 222 of the server 150 may include a space creator 310, a content linker 320, and a space sharer 330. Depending on example embodiments, the components of the processor 222 may be selectively included in or excluded from the processor 222. Also, depending on example embodiments, the components of the processor 222 may be separated or merged for representations of functions of the processor 222.

The processor 222 and the components of the processor 222 may control the server 150 to perform operations S410 to S440 included in the information sharing method of FIG. 4. For example, the processor 222 and the components of the processor 222 may be configured to execute an instruction according to a code of at least one program and a code of an OS included in the memory 221.

Here, the components of the processor 222 may be representations of different functions of the processor 222 performed by the processor 222 in response to an instruction provided from a program code stored in the server 150. For example, the space creator 310 may be used as a functional representation of the processor 222 that controls the server 150 to create a space having a unique coordinate value in response to the instruction.

Referring to FIG. 4, in operation S410, the processor 222 may read a necessary instruction from the memory 221 to which instructions associated with the control of the server 150 are loaded. In this case, the read instruction may include an instruction to control the processor 222 to perform the following operations S420 to S440.

Figure 5:
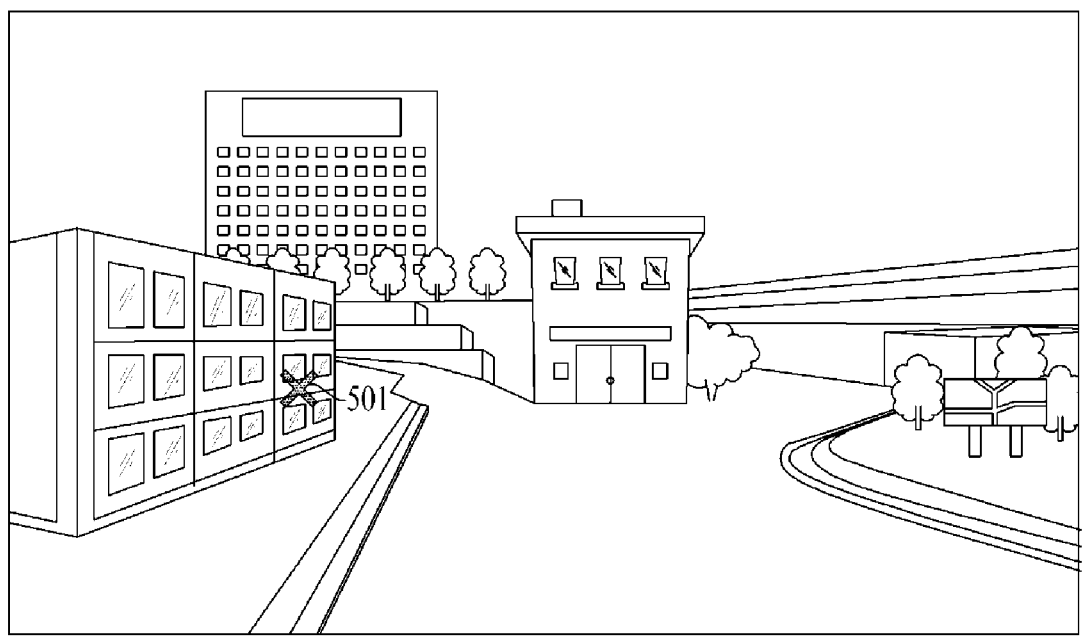
Figure 6:
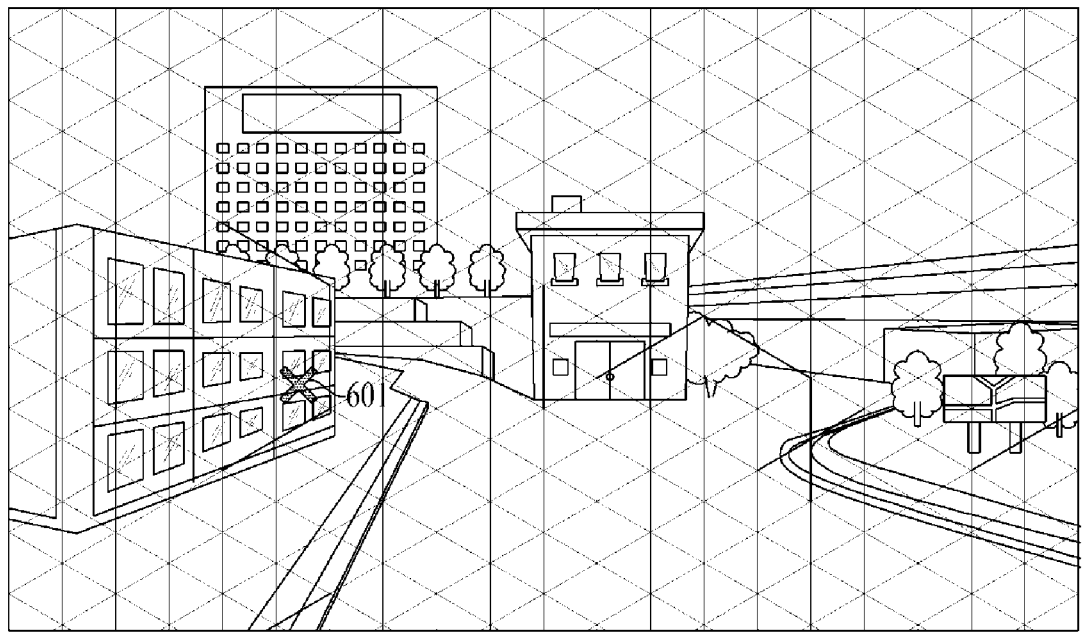

In operation S420, the space creator 310 may create a virtual space by assigning a unique coordinate value to a specified location. The space creator 310 may build a space, such as a virtual wall, in a real world specified by the electronic device 1 110 and may assign a unique coordinate value to each individual space. The specified location may refer to a location specifiable by the electronic device 1 110, such as, for example, a location selected by a user of the electronic device 1 110, the current location of the user recognized through interaction with the electronic device 1 110, a location pointed by a camera of the electronic device 1 110, and the like. The unique coordinate value may refer to address information for identifying a space, such as, for example, Internet address information (a uniform resource locator (URL)). For example, referring to FIG. 5, the space creator 310 may assign a unique coordinate value to a location 501 specified by the user and thereby create a virtual space at the corresponding location 501. For example, referring to FIG. 6, if a 3D map 600 for a real world is constructed, the space creator 310 may verify 3D coordinates (x, y, z) corresponding to a specific location 601 based on the 3D map 600 and may assign a unique coordinate value representing a virtual space to the corresponding location 601. 3D coordinates may be constructed at different levels based on mapping precision and may be subdivided based on centimeter (cm) or less, that is, a point cloud unit on a high-precision map. Referring to FIG. 7, the space creator 310 may assign a unique coordinate value 702 for each set of location coordinates 701 subdivided on a 3D map, that is, for each mapping point, and may use a corresponding location as a space capable of linking content of the user. Also, the space creator 310 may group point clouds based on a preset minimum unit and may assign a unique coordinate value for each grouped unit. For example, the space creator 310 may group mapping points based on a unit of 5 cm and may assign a unique coordinate value to each group. The unique coordinate value 702 may be assigned in advance for each set of location coordinates 701 as shown in FIG. 7 and, without directly visiting a specific location, the user may select a corresponding location and may create a virtual space at the selected location. As another example, the space creator 310 may verify the current location of the electronic device 1 110 based on a global positioning system (GPS) module or an inertial measurement unit (IMU) of the electronic device 1 110 and may verify and coordinate a specific location through a deep learning-based vision technology. For example, the space creator 310 may couple learning information, such as a specific shape (e.g., an appearance of a shop, a signboard, etc.) of a landmark or a point of interest (POI) with a GPS-based location and may calculate a unique value of the specific location to which the user desires to link content. Therefore, the space creator 310 may create the virtual space having the unique coordinate value at the specific location through localization of the space. In addition to a map mapping method, any technology capable of verifying a location, such as a GPS, wireless fidelity (WiFi), fingerprint, a visual positioning system (VPS), and a POI, may apply to the localization of the space.

Referring again to FIG. 4, in operation S430, the content linker 320 may link content desired to share with another user to the space created in operation S420. Here, the content may inclusively indicate any type of information representable in AR, such as, for example, a sticker, a text, an image, and a video. The content linker 320 may link the content on the space by storing a parameter of content authored by the user through an authoring function provided from the server 150 in association with the coordinate value assigned to the space. The content created through the authoring function refers to AR content and is provided in a variously controllable form based on 6 degrees of freedom (6 DoF), for example, motion, rotation, and translation. Here, motion, rotation, and translation of content controlled by the user may be stored in the server 150 with a default value of the content as tracking information. When another user shares the corresponding content, a form authored by an original user or control content may be included and reproduced based on tracking information of the content. Also, the content linker 320 may fixedly link content to a single space and may also link the content to at least two spaces while accessing the at least two spaces and may store translation information on the space with a default value of the content. For example, AR content desired to share while accessing a plurality of points, such as a proposal and a local tour guide, may include translation information including at least two spaces. The content linker 320 may set a sharing target range for content. For example, the content linker 320 may set the sharing target range to be public without limiting a sharing target or may set the sharing target range to be private by limiting the sharing target to a portion of users, for example, the very user, a friend or a neighbor, and the like. The sharing target range may be set for each piece of content and also may be set for the entire contents linked to a space for each space during a space creation process. Also, the content linker 320 may set a display condition for content. For example, the content linker 320 may separately set a content display status or display type for each time zone. For example, the content linker 320 may set a color of content to be differently represented during day and at night or may set content to be displayed only in evening hours and to not be displayed in other hours. In addition, the display condition may include a targeting setting, such as age, sex, and location.

In operation S440, the space sharer 330 may share the content linked to the corresponding space through the unique coordinate value assigned to the space. That is, the space sharer 330 may share the content on the space between users through the coordinated space. Here, the content to be shared may be provided as content on a web using a coordinate system as well as an AR-based service environment. Information on the space may be shared through interaction with a map service or a community, such as, for example, a blog and a café. For example, the space sharer 330 may use the coordinated space as a space for sharing POI information. For example, the space sharer 330 may link evaluations, reviews, spot photos, etc., on a restaurant to a corresponding space through a content template provided from an authoring function and may share the same with other users. Also, an owner may directly link promotion information on a spot of the owner and corresponding owner information may be displayed using a separate user interface (UI) through authentication. As another example, the space sharer 330 may use a coordinated space as a space for sharing landmark information. For example, a user may log in a map as a visit record of the user by linking a photo or authentication related content at a time of visiting a destination and may consume the linked content at a time of revisiting the same destination. As another example, the space sharer 330 may use the coordinated space as a space for recommending location-based content. The space sharer 330 may recommend content created in advance for a specific space, such that users visiting a corresponding location may use the content. For example, the space sharer 330 may provide the pre-made Turtle Ship AR content to a user visiting the Admiral Yi Sun-sin at Gwanghwamun Square, such that the user may consume or edit the AR content to use it. As another example, the space sharer 330 may use the coordinated space as a space for sharing specific location information in which meta information is absent. For example, the space sharer 330 may display a message at a point at which there is a lot of fish on a fishing ground such that other users may use the corresponding information, or may display a moving food truck or my location on a large scale festival to share with other users. As another example, the space sharer 330 may use content on the coordinated space as content on a web using a coordinate system. The space sharer 330 may augment and share coordinated space information on a two-dimensional (2D) map or a 3D map on the web. The space sharer 330 may share the content on the coordinated space through interaction with a specific community. The space sharer 330 may link the specific community related to the corresponding space to the coordinated space and may share the content on the space through the corresponding community. For example, the space sharer 330 may create a virtual space at a location at which a signing event of a specific celebrity proceeds, and may use content linked to the corresponding space as content of a fan café on the web through interaction with the fan café on the web. Therefore, the space sharer 330 may use the coordinated space as various types of spaces that allow communication between users. Here, content to be shared may be reproduced as is in a form authored or manipulated by the user not only on a virtual reality (VR) space but also at an AR location.

FIGS. 8 to 11 illustrate examples of a service screen for sharing content on a space according to an example embodiment.

Figure 8:
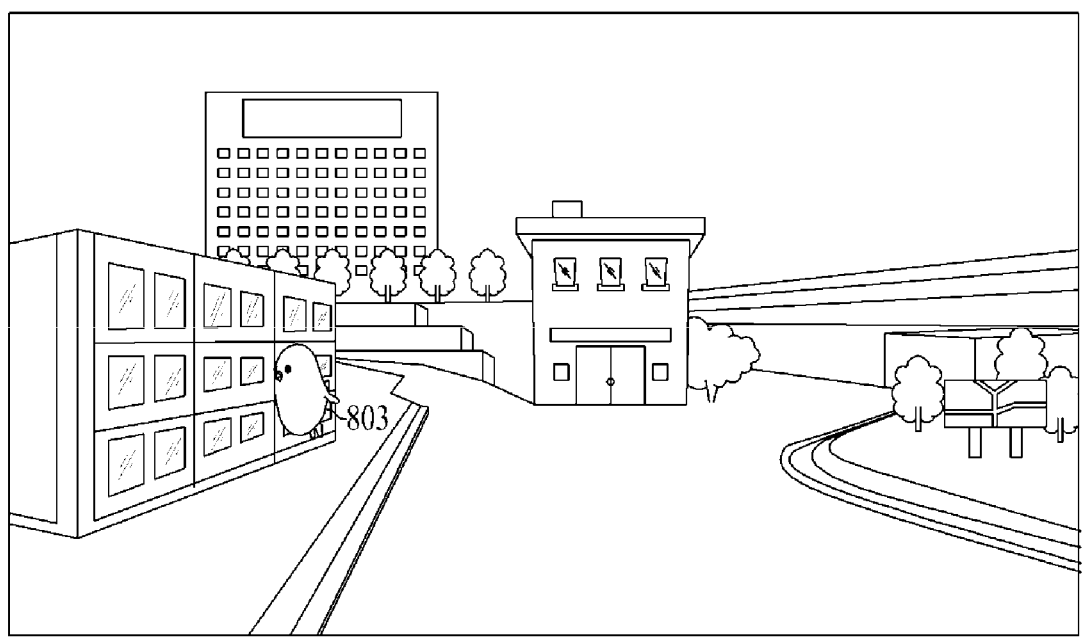
FIGS. 8 to 11 illustrate examples of a service screen for sharing content through a coordinated space according to an example embodiment.
Figure 9:
Figure 10:
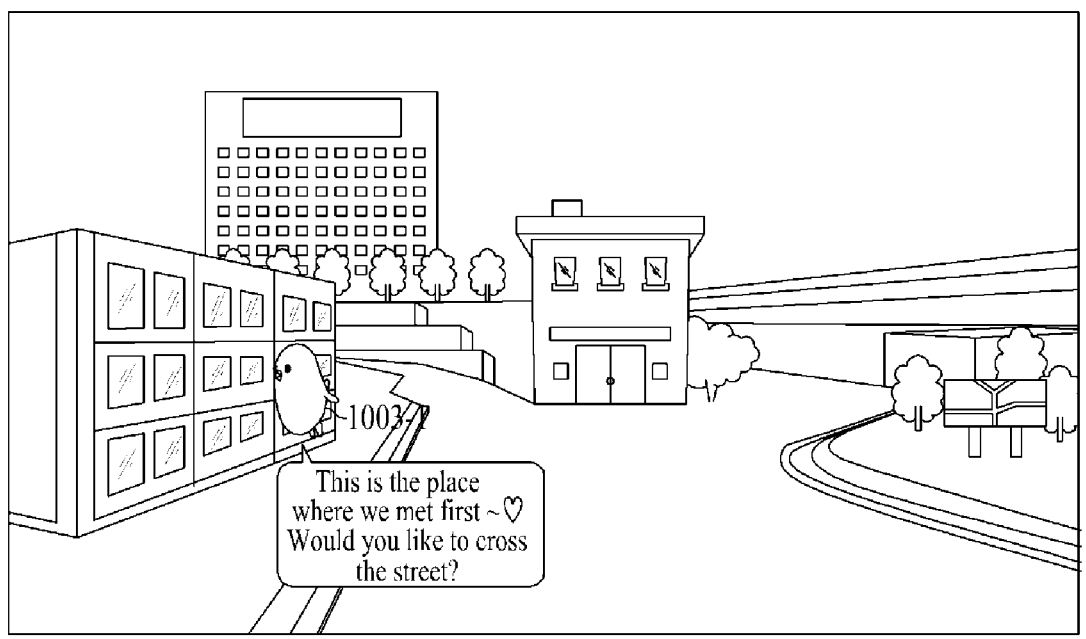
Figure 11:
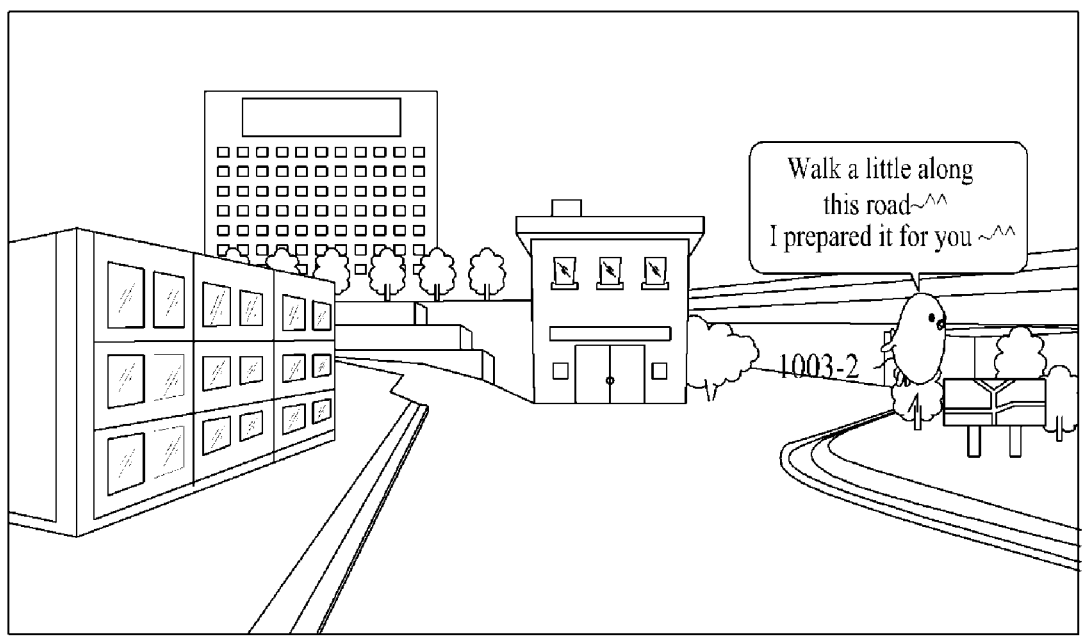

Referring to FIG. 8, a user A may create a virtual space S at a specific location and may upload AR content 803 on the virtual space S, and may share the AR content 803 on the corresponding space S with a user B that visits the location corresponding to the space S. The user B may view the content 803 uploaded by the user A to the space S through an exclusive application. For example, if the user B points to the virtual space S using a camera, the space sharer 330 may augment and display the content 803 uploaded by the user A to the space S. As another example, the space sharer 330 may provide the user B with a notification of sharing the space S and route information for a navigation to the space S, and, in response to an access from the user B to the space S, may augment and display the content 803 uploaded by the user A to the space S. As another example, referring to FIG. 9, if the user B uses a map that includes a location corresponding to the space S through a 2D map (e.g., a vector, a street view, etc.) or a 3D map service on the web, the space sharer 330 may augment the content 803 uploaded by the user A to the space S and may display the augmented content 803 on a map screen 900. As another example, the space sharer 330 may share linked AR content while accessing at least two spaces. For example, referring to FIGS. 10 and 11, the user A may upload content by linking a plurality of spaces as a message for proposing to the user B, and if the user B accesses a corresponding place while sequentially accessing the uploaded spaces, the space sharer 330 may sequentially augment and display contents 1003-1 and 1003-2 uploaded by the user A. Here, in the case of content that includes translation information on the space, the space sharer 330 may also provide route information for a movement navigation between spaces.

If users authoring content on a space increases, a large amount of contents may be accumulated at a specific location and contents accumulated by many users on a specific space may exhibit history and characteristics of the corresponding location and real-time information. When displaying AR content using, for example, a 2D map, a 3D map, and a street view, many contents may not be simultaneously displayed due to spatial constraints. Therefore, technology for semantically filtering contents accumulated on a time axis on the space is required.

The space sharer 330 may select content to be displayed on the specific space based on a predetermined criterion. Here, a selection criterion may be selected automatically or may be selected by the user. For example, the space sharer 330 may select content to be displayed for the user based on a display condition (including a targeting setting) set to the content. As another example, the space sharer 330 may classify content into a preset category and may display content of a category selected by the user. As another example, the space sharer 330 may select and display popular content or content linked by a popular user based on a content popularity or a user popularity. As another example, the space sharer 330 may select and display a number of contents requested by the user based on an up-to-date feature, the popularity, and the category of content. As another example, the space sharer 330 may select and display content corresponding to a search condition input from the user by providing a search function for content.

According to example embodiments, it is possible to coordinate a 3D space for the real world and to use the coordinated space as a space for sharing content between users, such as, for example, a content platform.

If messaging on a space is possible, each space may serve as an important communication medium that represents social context as a community for contemporaries or users having the same understanding and consensus. For example, Gwanghwamun Square is a symbol of the candle rally and a location of "Winter Opera" is also a sacred place for fans. At the vicinity of the National Assembly Building or Yeouido, people gather to express their voices while holding messages to convey to members of the National Assembly.

Herein, provided is a spatial messaging system that may initiate a space-based social communication online and performing crowdsourcing and archiving of a message through a corresponding space. Such a system may allow users to directly present the reasons why authoring is necessary on a space, may provide a guide for content creation, and also may solve absence of content in a space or difficulty in authoring spatial content. Also, a space itself may be a basis of an AR system capable of becoming a social messaging system, and accordingly may provide motivation for content creation and may induce more contents to be created on the space.

AR content is generally created in a 3D format due to characteristics of a 3D real space. In particular, there is an increasing need for content that depicts the real world such as a character model. Although the 3D content is capable of performing various interactions, it may be difficult to cope with a real-time AR situation and there are some constraints in providing realistic interactive experience using pre-made motions and the like. Herein, it is possible to provide an automated environment in which a virtual character or object may be automatically interactive based on an authoring result between users on a space.

Figure 12:
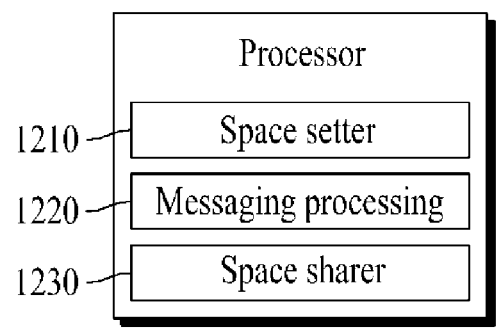
FIG. 12 is a block diagram illustrating another example of components includable in a processor of a server according to an example embodiment.
Figure 13:
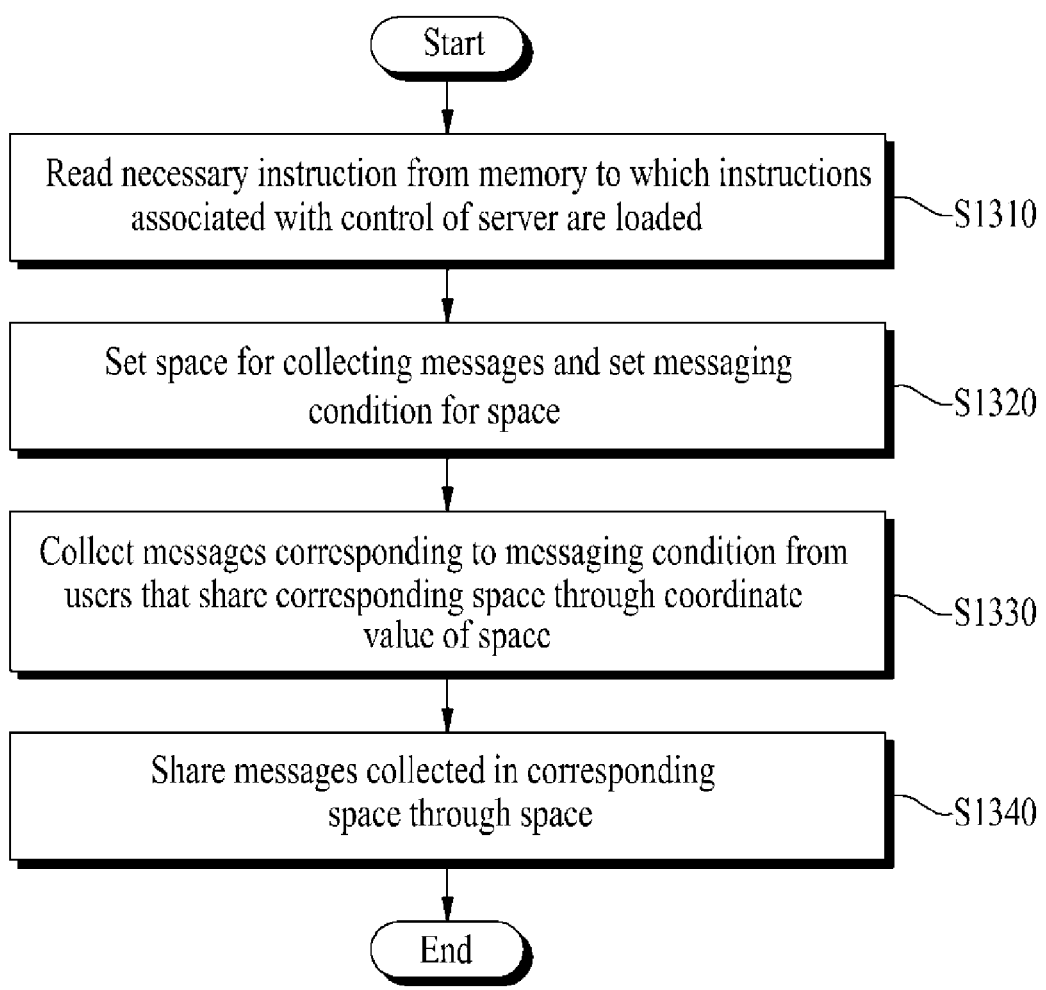
FIG. 13 is a flowchart illustrating another example of an information sharing method performed by a processor of a server according to an example embodiment.

FIG. 12 is a block diagram illustrating another example of components includable in the processor 222 of the server 150 according to an example embodiment, and FIG. 13 is a flowchart illustrating another example of a method performed by the processor 222 of the server 150 according to an example embodiment.

To perform a spatial messaging method of FIG. 13, referring to FIG. 12, the processor 222 of the server 150 may include a space setter 1210, a messaging processor 1220, and a space sharer 1230. Depending on example embodiments, the components of FIG. 12 may be selectively included in or excluded from the processor 222 with the components of the processor 222 of FIG. 3. Also, depending on example embodiments, the components of FIG. 12 may be separated from or merged with the components of the processor 222 of FIG. 3 for representation of functions of the processor 222.

The processor 222 and the components of the processor 222 may control the server 150 to perform operations S1310 to S1340 included in the spatial messaging method of FIG. 12. For example, the processor 222 and the components of the processor 222 may be configured to execute an instruction according to a code of at least one program and a code of an OS included in the memory 221.

Referring to FIG. 13, in operation S1310, the processor 222 may read a necessary instruction from the memory 221 to which instructions associated with control of the server 150 are loaded. In this case, the read instruction may include an instruction for controlling the processor 222 to perform the following operations S1320 to S1340.

In operation S1320, the space setter 1210 may set a space (hereinafter, referred to as a "messaging space") for collecting messages in a space to which a unique coordinate value corresponding to a location in the real world is assigned through localization and may set a messaging condition for the corresponding space.

Figure 14:
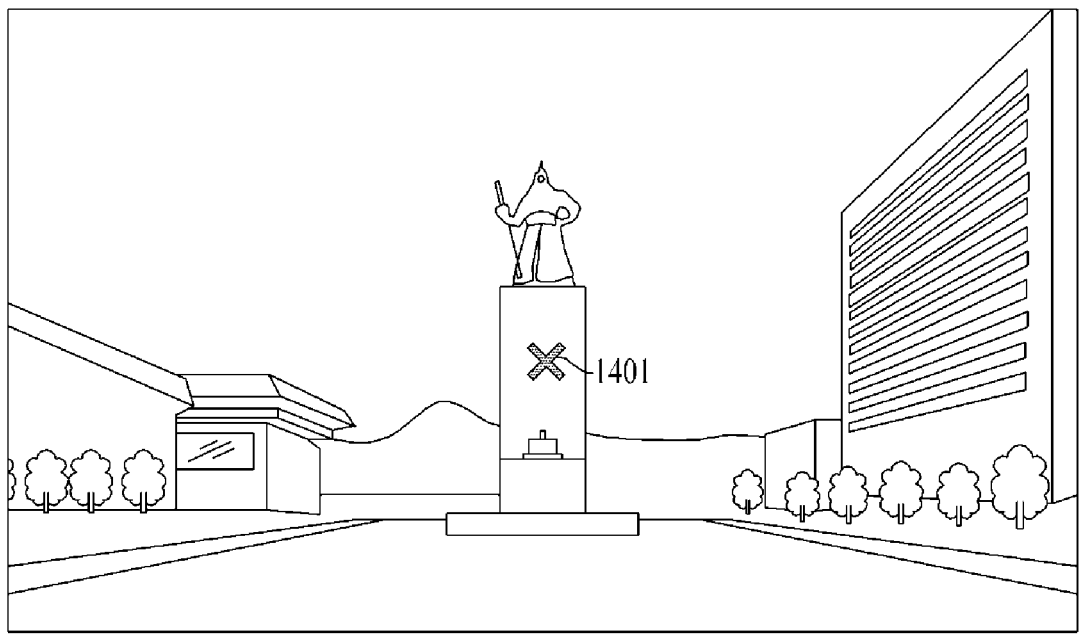
FIG. 14 illustrates an example of a process of designating a location of a messaging space according to an example embodiment.

Initially, the space setter 1210 may designate a location for collecting messages on a particular space of the real world based on the settings of the user that suggests message sharing at that space. For example, the space setter 1210 may provide a user interface (UI) for location designation using a 2D map or a 3D map and may designate a location for collecting messages on the map through the UI. The UI using the map may provide a pointing function, an area selection function, and a line drawing function as an edition tool for designating a location. Accordingly, a user may point and designate a specific point or may select an arbitrary area and designate the selected area as a location of a shape type, or may draw a line with an arbitrary length and designate the line as a location of a line type. That is, a location capable of being designated may be a POI or a spot and a specific point corresponding to a landmark, and may be a shape designated as an arbitrary area and a line designated with an arbitrary length. For example, the front gate of the National Assembly may be designated as a specific point such as a spot, the surrounding site where the National Assembly is located may be designated using a shape type, and the Berlin wall or the ceasefire line may be designated using a line type. As another example, the space setter 1210 may also designate, as a messaging space, a location specified by an electronic device of a user in an AR-based service environment. A user who desires to suggest messaging may directly visit a site with an electronic device, such as a mobile device or a wearable device and may designate a space for collecting messages. For example, referring to FIG. 14, a location 1401 pointed by the user with a camera screen 1400 may be designated as a messaging space. Here, a location of a specific point level pointed by a camera of the mobile device, or a location of a shape type or a line type designated by the user using an edition tool on a camera screen may be designated as a location. Alternatively, if the user is moving while holding an electronic device with a location designation request, it is possible to track a travel route of the user and to designate a tracked route as a location of a shape type or a line type. The space setter 1210 may create a coordinated virtual space at a corresponding location by assigning a unique coordinate value at the location designated by the user and may set the created virtual space as a social community space. The space setter 1210 may designate multiple areas as locations for collecting messages. For example, as described above with reference to FIGS. 10 and 11, the space setter 1210 may designate a multi-area including a plurality of areas as a messaging space.

The space setter 1210 may designate a location for the messaging space and may set a messaging condition for the corresponding space. For example, the space setter 1210 may set a message type attachable to the designated location. For example, the space setter 1210 may propose to wear a yellow ribbon in commemoration of Sewol Ferry at a designated location of Gwanghwamun Square, or to gather messages to be sent to a specific celebrity in front of the building entrance of an entertainment company. Also, the space setter 1210 may propose to create various contents and meaningful contents, such as drawing AR murals on ruined school buildings or creating virtual flower paths on Gangnam street. Through this, a specific location may be used as a location-based or place-based marking or promotion space. For example, a shop owner may be encouraged to attach specific content related to a shop of the shop owner at a shop location as a promotion and incentives may be given to those who participate in the promotion. Here, the space setter 1210 may set a sharing target range for the location designated as the messaging space. For example, the space setter 1210 may set the sharing target range to be public without limiting a sharing target or may set the sharing target range to be private by limiting the sharing target to a portion of users (e.g., a friend or a neighbor) or to a group of a specific condition (e.g., related community certified member, a profile group such as age or gender). Also, the space setter 1210 may set a target value of messaging, e.g., number of messages, number of people participating in the messaging, or number of people visiting a given location, etc., and incentives according to goal achievement for the location designated as the messaging space. For example, the space setter 1210 may set a goal, such as putting 100 ribbons in front of Exit No. 4 of Gangnam station and posting 100 messages for foreign visitors on the Gangnam City Guide Wall, and may set certain incentives to be provided to all participants if the set goal is met. Also, the space setter 1210 may set a content condition or a custom asset linkable to the location designated as the messaging space. The content condition may include a type or range of content attachable to a corresponding space. A user suggesting messaging may upload in advance the custom asset linkable to the corresponding location. The custom asset may be automatically recommended and used when another user authors a message. For example, the space setter 1210 may provide the pre-made Turtle Ship AR content to a user visiting the statue of Admiral Yi Sun-sin at Gwanghwamun Square, such that the user may consume or edit the AR content to use it.

Therefore, the space setter 1210 may designate a location for collecting messages based on settings of the user that suggests message sharing, and may set a messaging condition that includes a linkable message type, a sharing target range, a target value and incentives, and a custom asset, with respect to the designated location.

Figure 15:
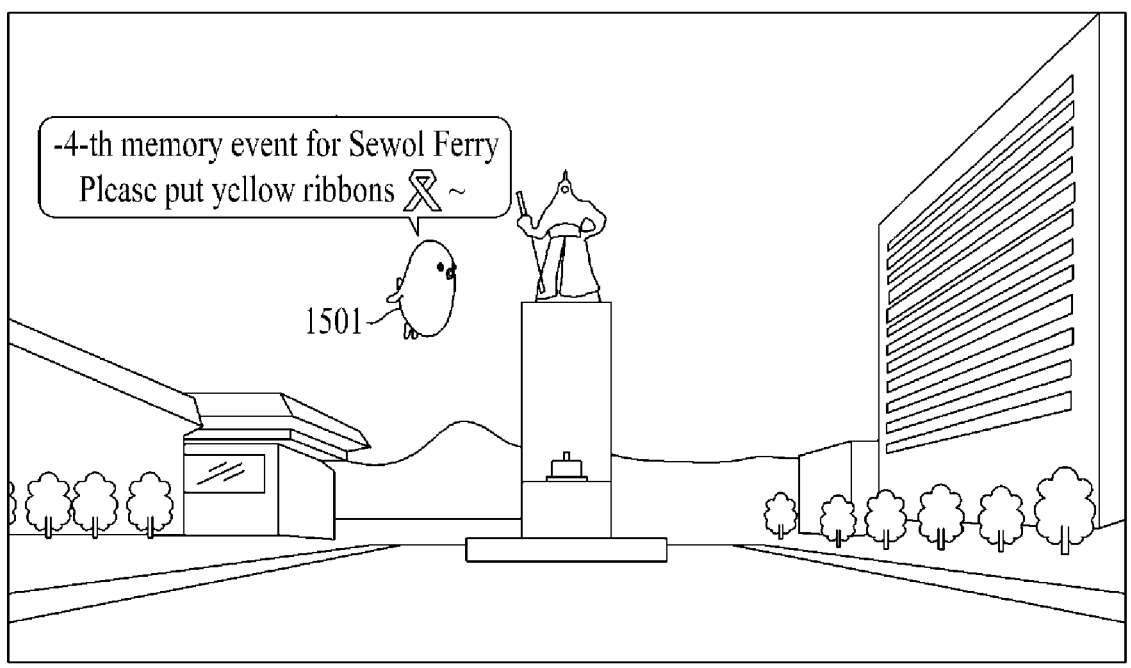
FIGS. 15 and 16 and FIGS. 17A and 17B illustrate examples of a process of attaching content as a space message according to an example embodiment.
Figure 16:
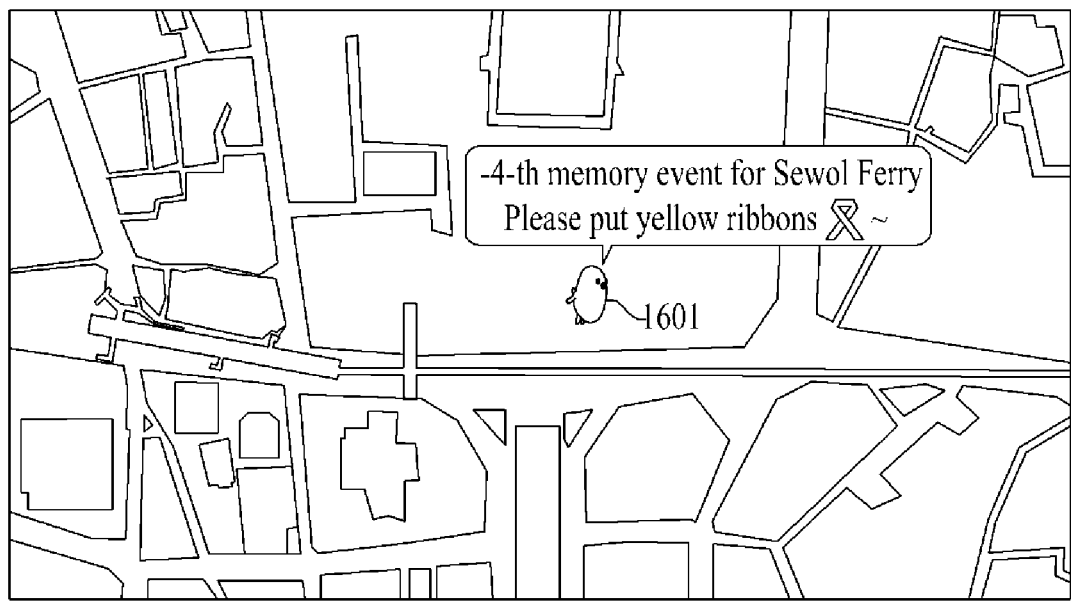

Referring again to FIG. 13, in operation S1330, the messaging processor 1220 may collect messages corresponding to the messaging condition from users sharing the corresponding space through the coordinate value of the space designated as the location for messaging. That is, the messaging processor 1220 may crowdsource at least one piece of content by users sharing the space designated as the messaging location as a message of the corresponding space. For example, the messaging processor 1220 may provide information about the messaging space such that users may recognize the messaging space in an AR-based service environment and may induce actions of the users. The messaging processor 1220 may provide a notification to users that meet a condition of a preset disclosure target range and may provide a UI that allows a user receiving the notification to attach a message when the user is directed to the corresponding location. Through this, the messaging processor 1220 may crowdsource messages authored by many users. For example, referring to FIG. 15, in response to the user physically moving to a location designated as a messaging space and executing a camera, i.e., photographs the messaging space, the messaging processor 1220 may provide a UI 1501 that includes a spatial messaging guide through a camera screen 1500. Here, the messaging processor 1220 may recommend pre-uploaded content or custom asset with the UI 1501. Accordingly, users may author and link contents to the corresponding location using the recommended content. As another example, the messaging processor 1220 may provide information about the messaging space using a 2D map or a 3D map on a web using a coordinate system. Referring to FIG. 16, if the user uses a map that includes a location corresponding to the messaging space through a 2D map service (e.g., a vector, a street view, etc.) or a 3D map service, the messaging processor 1220 may provide a UI 1601 that includes a spatial messaging guide at a corresponding location through a corresponding map screen 1600. Users may create and link a message using a 2D map or a 3D map on the web without visiting the actual location. An authoring environment for spatial messaging may be provided in a service environment on the web using the coordinate system as well as the AR-based service environment, which may be determined based on settings of the user that suggests message sharing. A function capable of attaching various contents while moving the space designated as the messaging space may be included in the authoring environment for spatial messaging. Accordingly, the messaging processor 1220 may provide a content authoring function for the messaging space and may link content authored through the content authoring function as a message of the corresponding space, and may crowdsource messages of many users.

That is, referring again to FIG. 13, in operation S1340, the space sharer 1230 may share messages collected in the corresponding space through the space designated as the location for messaging. The messages collected in the space may be provided as contents on the web using the coordinate system as well as the AR-based service environment. Even content created on the virtual reality (VR) using a 2D or 3D map service with respect to the messaging space may be displayed alike on the AR. On the contrary, content created in a real space using a VR-based service may be visualized on online 2D or 3D as various contents such as heat map and may be used as web content. Messages collected in the corresponding space may be shared through interactions between the messaging space and a community, such as a blog and a café. For example, a virtual space may be created in a place in which a signing event of a specific celebrity takes place and may be linked to a fan café for interaction. Accordingly, content linked to the corresponding space may be used as content of the fan café. Therefore, the space sharer 1230 may perform crowdsourcing and archiving of messages through the space directly proposed by the users, and the content collected as a space message may also be used as various analysis data for the corresponding location.

If a preset target value of messaging is achieved in response to the content being linked to the messaging space, the space sharer 1230 may provide a notification according to the goal achievement to users that link contents to the corresponding space or may provide incentives according to the goal achievement to the users. Also, the space sharer 1230 may provide a feedback function on the corresponding space with respect to the content linked to the messaging space. For example, the space sharer 1230 may provide a comment input function for feedback of another user with respect to each piece of content attached to the messaging space. Also, if a plurality of pieces of contents are linked to the messaging space, the space sharer 1230 may provide an appropriate sorting and ranking, a clustering UI, and the like. For example, the space sharer 1230 may classify content based on a predetermined classification criterion, for example, a category, and may selectively display content of a category selected by the user. As another example, the space sharer 1230 may select and display content linked by a popular user based on a popularity of a user that links content. The popularity may be calculated based on an accumulated number of linked contents and evaluation information by other users. As another example, the space sharer 1230 may select and display a number of contents requested by the user or a number of contents preset based on an up-to-date feature and a category of content. As another example, the space sharer 1230 may provide a content search function and may select and display content corresponding to a search condition input from the user.

Figure 17A:
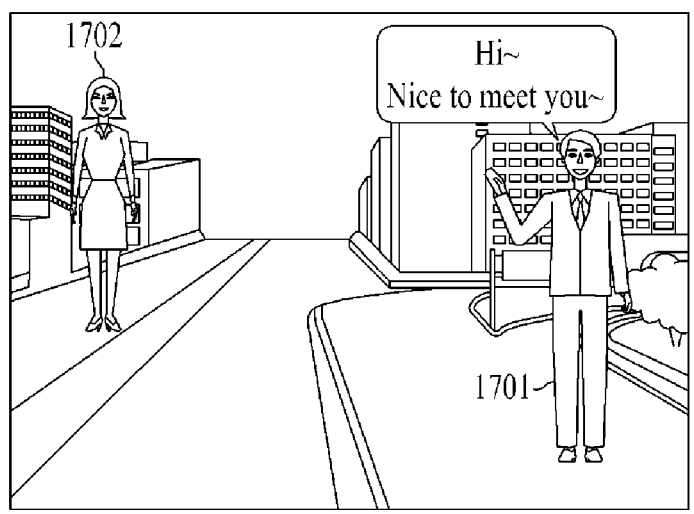
Figure 17B:
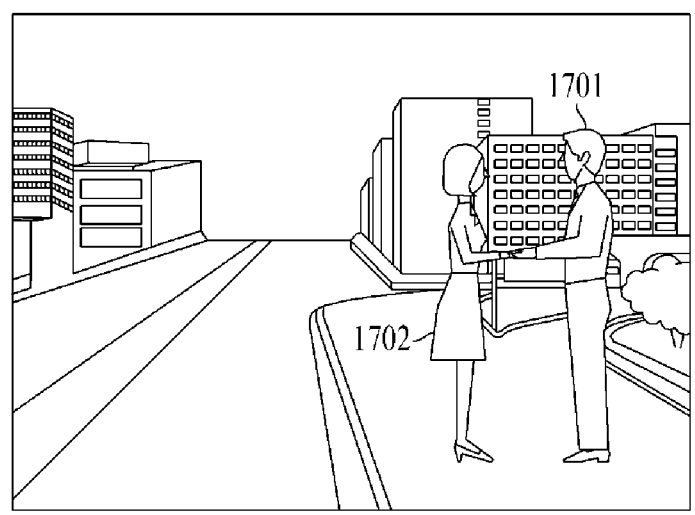

In addition, the space sharer 1230 may output an interaction automated for the corresponding space in response to the content being linked to the messaging space. The interaction may be defined in the messaging space. If a condition preset for the content linked to the corresponding space is met, an interaction corresponding thereto may occur. For example, if a user A directly links content of a character A to a space suggested for messaging and, here, another user B links content of a character B to the corresponding space, an interaction in which the content of the character A hugs the content of the character B may occur. As another example, if the user A directly links content of the character A to the space suggested for messaging and another user B accesses the corresponding space, an interaction in which the content of the character A makes a gesture or calls a name (e.g., an ID or a nickname) of the user B may occur. A type or intensity of interaction may be directly set by the user that suggests the message sharing, or may be automatically changed based on various conditions, for example, a spatial distance from a user accessing the messaging space and price of content linked to the messaging space. Also, a different interaction may apply based on a characteristic of the messaging space, for example, a characteristic of the corresponding space such as a memorial space, a government office, a tourist spot, and a festival place. Here, in response to occurrence of the interaction, the space sharer 1230 may provide a notification or a screen according to the occurrence of the interaction to a user of content that triggers the corresponding interaction. The messaging space may be combined with a business model that is configured to charge for a point having a social, geographical, historical, or symbolic importance or having a high messaging need and to set an occupancy period and thereby allow occupancy of the corresponding point based on the set occupancy period. In the case of a space that provides an interaction between contents, price for an occupancy period may be determined to be relatively high compared to other spaces. Referring to FIGS. 17A and 17B, if a user B creates content B 1702 around a specific space of content A 1701 created by an entertainer A, an interaction of the content A 1701 with the content B 1702 may occur. Here, a different interaction may occur based on the distance between the content A 1701 and the content B 1702. For example, if the content B 1702 is created outside a desired distance, an interaction in which the content A 1701 makes a gesture (FIG. 17A) may occur. If the content B 1702 is created at a location close to the content A 1701, an interaction in which the content A shakes hands with the content B 1702 may occur (FIG. 17B). In this case, an occupancy price of a desired time unit for a corresponding space may increase according to a decrease between specific content and the corresponding space.

Further, if messaging on a space is possible, there is a space with high scarcity to which many users desire to link their contents. Due to a characteristic of AR space for augmenting and thereby exhibiting content, if many contents are linked to the AR space, the contents may overlap, which may make browsing difficult.

Therefore, according to an example embodiment, it is possible to charge for a point having a social, geographical, historical, or symbolic importance or having a relatively high messaging need in a coordinated space and to set an occupancy period and thereby allow occupancy of the corresponding point based on the set occupancy period.

Figure 18:
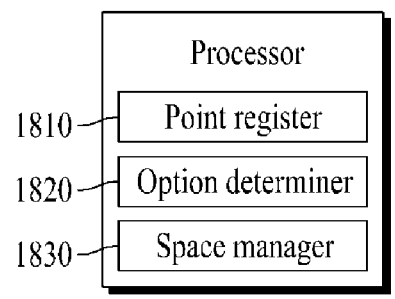
FIG. 18 illustrates still another example of components includable in a processor of a server according to an example embodiment.
Figure 19:
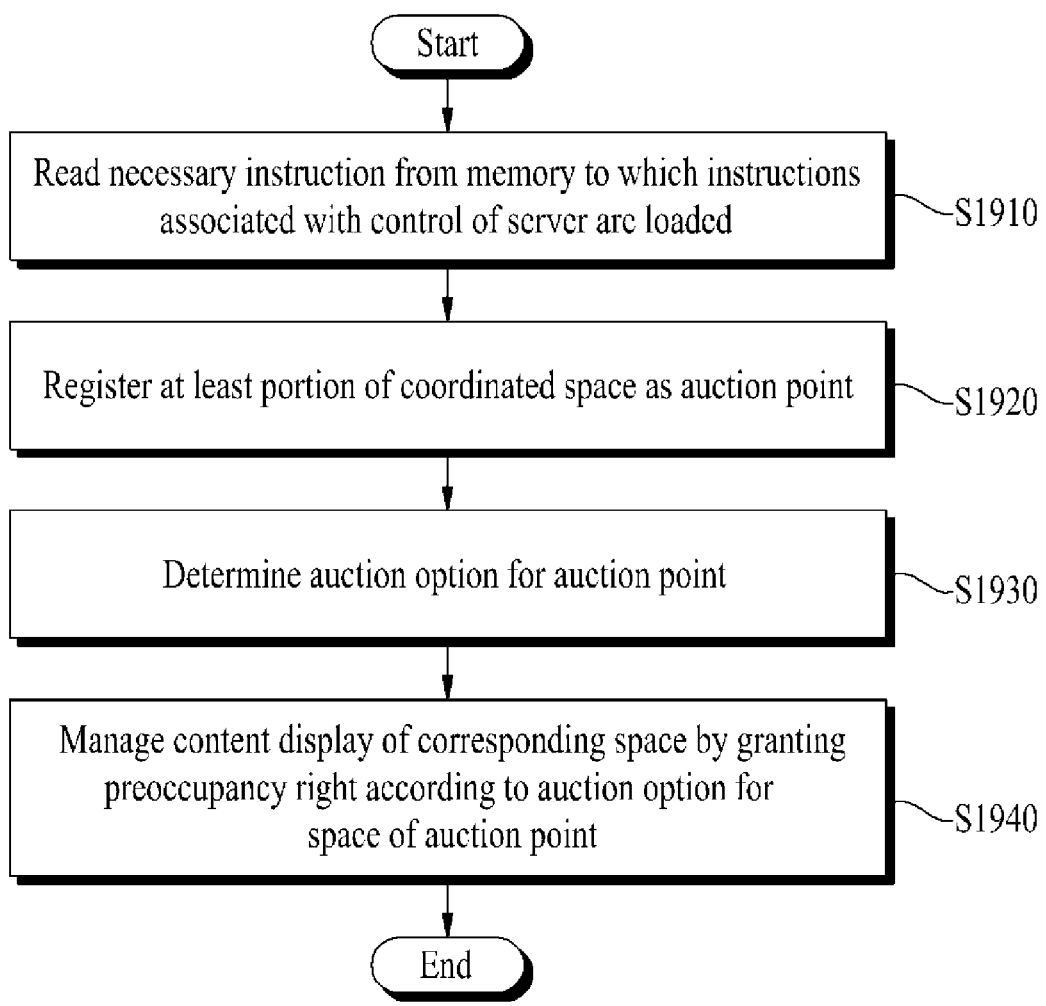
FIG. 19 is a flowchart illustrating still another example of an information sharing method performed by a processor of a server according to an example embodiment.

FIG. 18 illustrates still another example of components includable in the processor 222 of the server 150 according to an example embodiment, and FIG. 19 is a flowchart illustrating still another example of a method performed by the processor 222 of the server 150 according to an example embodiment.

To perform a space occupancy method of FIG. 19, referring to FIG. 18, the processor 222 of the server 150 may include a point register 1810, an option determiner 1820, and a space manager 1830 as components of the processor 222. Depending on example embodiments, the components of FIG. 18 may be selectively included in or excluded from the processor 222 with the components of the processor 222 of FIG. 3. Also, depending on example embodiments, the components of the processor 222 may be separated or merged for representation of functions of the processor 222.

The processor 222 and the components of the processor 222 may control the server 150 to perform operations S1910 to S1940 included in the space occupancy method of FIG. 19. For example, the processor 222 and the components of the processor 222 may be configured to execute an instruction according to a code of at least one program and a code of an OS included in the memory 221.

Referring to FIG. 19, in operation S1910, the processor 222 may read a necessary instruction from the memory 221 to which instructions associated with control of the server 150 are loaded. In this case, the read instruction may include an instruction for controlling the processor 222 to perform the following operations S1920 to S1940.

In operation S1920, the point register 1810 may register, as an auction point, at least a portion of a space to which a unique coordinate value corresponding to a location in the real world is assigned through localization, that is, a coordinated space. For example, the point register 1810 may selectively register a coordinated space as an auction point through a separate authoring tool in association with map information that is pre-stored in the server 150. For example, the point register 1810 may designate in advance important points, such as, Gwanghwamun Square, in front of Gwanghwamun Statue of King Sejong the Great, a place where a social issue, such as the disaster of the Sewol Ferry, has occurred or a place where a related event is held, a famous landmark or a tourist attraction, a popular restaurant, and a hot spot, and, if a space is to be created at a point predesignated through an authoring tool, may register a corresponding point as an auction point. As another example, the point register 1810 may register, as an auction point, a point corresponding to a popular search area online in association with a search characteristic. That is, the point register 1810 may analyze a search query on the Internet, may select an important point such as a popular area, a location name, a POI, etc., and may register, as the auction point, a space coordinated at a location of the selected point. As another example, the point register 1810 may register at least a partial space as an auction point based on a number of contents linked on the coordinated space. If a preset number (N) of or more contents are linked to a space of a specific point, the point register 1810 may automatically register the corresponding point as an auction point. Therefore, the point register 1810 may passively designate a space with high scarcity or may automatically select a space among virtual spaces that are coordinated and thereby linkable with a variety of information and may register the selected space as an auction point.

In operation S1930, the option determiner 1820 may determine an auction option for the auction point. The auction option may include at least one of a selling price and an occupancy period for the auction point. For example, since a grade or weight is preset for each auction point, the option determiner 1820 may determine a selling price and an occupancy period corresponding to the grade. The grade for each auction point may be preset based on a POI category or a regional characteristic of the corresponding point. As another example, the option determiner 1820 may calculate a grade based on a popularity of a corresponding point for each auction point and may determine the selling price and the occupancy period corresponding to the calculated grade. The popularity of the auction point may be calculated based on a search count, a number of linked contents, and evaluation information according to user feedback. For example, according to an increase in the popularity of a point, the selling price of the corresponding point may be determined to increase and the occupancy period of the point may be determined to decrease. In addition to the aforementioned auction option, various types of auction methods, such as an auction method applicable to a keyword advertising and an auction method of occupying a coordinated space may apply.

In operation S1940, the space manager 1830 may manage content of a corresponding space by granting a preoccupancy authority according to the auction option for the space registered as the auction point. The space manager 1830 may request a user desiring to link content to the space registered as the auction point to pay a selling price determined for the corresponding point. Once purchase is completed through the payment, the space manager 1830 may grant the preoccupancy authority for displaying content during the determined occupancy period. An auction system is automatically activated for a space to which a desired number of contents or more are linked. Here, the auction option may be presented to users that link contents to the corresponding space and a preoccupancy authority of the space may be granted to a specific user that accepts the presented auction option. Among contents on the space, only content uploaded by the user having the preoccupancy authority or content related to the user may be displayed and displaying of remaining contents may be restricted. As described above, the auction option may be presented for a space linked with competitive content. Here, if there is no competitive content, a preoccupancy authority of a user having first uploaded content may be maintained.

In a crowdsourcing content creation environment in which AR content is linked to a coordinated space, there may be an increasing content creation need for a specific location. The specific location may be preoccupied by companies as well as individuals and used as a communication or marketing method. The space manager 1830 may display content uploaded by a user having a preoccupancy authority of a corresponding space or content related to the user having the preoccupancy authority through the specific space preoccupied through an auction. Here, the space manager 1830 may manage linkage or display of content on the corresponding space based on a condition that is set by the user having the preoccupancy authority of the specific space. The setting condition may include a range or type of content linkable to the corresponding space, a content linkage target range, a content display condition, and event information. That is, the space manager 1830 may set a condition of content linkable to the specific space by preoccupying the specific space, a condition of a user capable of linking content to the corresponding space, and a condition of an event. For example, if a space nearby a shop of a company A is preoccupied by the company A, the space manager 1830 may display only stickers posted by the company A or may display stickers related to the company A, posted by other users. For expansion of various services, various stickers may be posted based on settings of the company A. In particular, the space manager 1830 may provide a discount coupon in response to posting a sticker related to the company A. Also, the space manager 1830 may allow all of the users to upload contents to the space preoccupied by the company A. Alternatively, the space manager 1830 may allow only a user adding the company A as a messenger friend to upload content to the space preoccupied by the company A. As an example of a content display condition for the preoccupied space, it is possible to classify and set a content display status or a content display type for each time zone. For example, a color of content may be represented differently during the day and night, or content may be set to be displayed only in the evening hours and not be displayed in other time zones. In addition, the display condition may include targeting settings, such as age, sex, and location.

The space manager 1830 may recommend content related to a target that preoccupies a corresponding space in response to linking content to the specific space preoccupied through the auction. The space manager 1830 may recommend content pre-made for the preoccupied space such that users visiting the corresponding location may use the content. For example, the space manager 1830 may provide pre-made AR content of the company A to a user visiting a shop of the company A, such that the user may consume the AR content as is or may edit and use the AR content.

As described above, according to example embodiments, it is possible to configure a space as a social messaging system by proposing a space-based social communication and to perform crowdsourcing and archiving of geofencing-based AR content through such a messaging space. Also, according to example embodiments, it is possible to induce occupancy competition for a space and to use the space as a new type of a marketing channel by setting an occupancy period and by selling the space allowing messaging and sharing through coordination based on the set occupancy period.

The apparatuses described herein may be implemented using hardware components, software components, and/or a combination thereof. For example, the apparatuses and the components described herein may be implemented using one or more general-purpose or special purpose computers or processing devices, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. Here, the media may continuously store computer-executable programs or may transitorily store the same for execution or download. Also, the media may be various types of recording devices or storage devices in a form of one component or a plurality of hardware components combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of other media may include record media and storage media managed by Appstore that distributes applications or a site that supplies and distributes other various types of software, a server, and the like.

While the example embodiments are described with reference to specific example embodiments and drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A method performed by a computer system for sharing messages, the method comprising:
    selecting a real location in a predetermined real space;
    constructing a three-dimensional map of the predetermined real space, and subdividing the predetermined real space containing the selected real location into a plurality of three-dimensional location coordinates;
    assigning a unique coordinate value for each of the plurality of three-dimensional location coordinates in the predetermined real space to create a virtual space at each of the plurality of three-dimensional location coordinates, wherein each of the unique coordinate values for each of the plurality of three-dimensional location coordinates in the predetermined real space includes a uniform resource locator (URL) for identifying a location of the corresponding virtual space;
    registering a virtual space corresponding to the selected real location as an auction point for enabling users to request a preoccupancy authority of the virtual space;
    granting the preoccupancy authority to an auction option for the registered virtual space to a user, responsive to a payment of a selling price for the preoccupancy authority of the registered virtual space by the user;
    setting, as a messaging space, the registered virtual space of the user having the preoccupancy authority;
    providing a location of the messaging space to at least one other user;
    displaying a guide user interface for providing a messaging guide to the at least one other user on the messaging space, at least one piece of pre-uploaded content authored by another user being recommended to the at least one other user in association with the guide user interface;
    collecting, as a message for the messaging space, at least one piece of content authored by the at least one other user that shares the messaging space through a coordinate value of the messaging space; and displaying the content authored by the at least one other user on the messaging space.

2. The method of claim 1, wherein the setting of the registered virtual space comprises providing a user interface (UI) for location designation using a map to set, as the messaging space, a location designated on the map through the UI or to set, as the messaging space, a location specified by an electronic device of the user in an augmented reality (AR)-based service environment.

3. The method of claim 1, wherein the setting of the registered virtual space comprises setting a messaging condition that includes at least one of a content type attachable to the messaging space, a sharing target range for the messaging space, a messaging goal of the messaging space, and a content custom asset attachable to the messaging space, and the collecting of the at least one piece of content comprises collecting content corresponding to the messaging condition with respect to the at least one other user that shares the corresponding messaging space through the coordinate value of the messaging space.

4. The method of claim 1, wherein the collecting of the at least one piece of content comprises providing a content authoring function for the messaging space in response to specifying the location designated as the messaging space in an AR-based service environment, and collecting content authored through the content authoring function as a message of the messaging space, and providing a content authoring function for the messaging space in response to using a map that includes the location designated as the messaging space through a map service on a web, and collecting content authored through the content authoring function as a message of the messaging space.

5. The method of claim 1, further comprising: sharing the content collected in the messaging space through the coordinate value of the messaging space.

6. The method of claim 5, wherein the sharing of the collected content comprises providing the content collected in the messaging space based on the coordinate value of the messaging space as content on a web using a coordinate system.

7. The method of claim 5, wherein the sharing of the collected content comprises providing, as AR content, the content collected in the messaging space on an AR space that includes the space.

8. The method of claim 5, wherein the content collected in the messaging space is shared through interaction with a community related to the messaging space.

9. The method of claim 5, wherein the sharing of the collected content comprises selecting and displaying a portion of contents collected in the messaging space based on at least one selection criterion among a category, an up-to-date feature, and a popularity of content, a number of contents requested, and a search condition for the messaging space.

10. The method of claim 5, wherein the sharing of the collected content comprises providing an interaction corresponding to a condition associated with at least one of a characteristic of the location designated as the messaging space, an access distance for the messaging space, and the content collected in the messaging space.

11. The method of claim 1, wherein the virtual space is registered in response to the virtual space being created at a location of a point selected as a search characteristic.

12. The method of claim 1, wherein the registering of the virtual space comprises registering at least a portion of the virtual space as the auction point based on a number of contents linked on the virtual space.

13. The method of claim 1, wherein the auction option includes at least one of a selling price and an occupancy period for the auction point.

14. The method of claim 1, further comprising: calculating a grade of a corresponding point based on a popularity of the auction point and determining the auction option that includes at least one of a selling price and an occupancy period corresponding to the calculated grade.

15. The method of claim 1, further comprising displaying at least one of content linked by the user having the preoccupancy authority and content related to the user having the preoccupancy authority through the messaging space.

16. The method of claim 1, further comprising:

setting at least one of a condition of content linkable to the messaging space by the user having the preoccupancy authority of the virtual space, a condition of a user capable of linking content to the messaging space, a content display condition of content displayed through the messaging space, and a condition of an event provided through the messaging space; and managing the content on the messaging space based on the set condition.

17. A non-transitory computer-readable recording medium storing a program to computer-implement the method for sharing messages according to claim 1.

18. A computer system comprising:

at least one processor configured to execute computer-readable instructions included in a memory, wherein the at least one processor comprises:

a space creator configured to constructing a three-dimensional map of the predetermined real space, and subdividing the predetermined real space containing a selected real location into a plurality of three-dimensional location coordinates, and assigning a unique coordinate value for each of the plurality of three-dimensional location coordinates in the predetermined real space to create a virtual space at each of the plurality of three-dimensional location coordinates, wherein each of the unique coordinate values for each of the plurality of three-dimensional location coordinates in the predetermined real space includes a uniform resource locator (URL) for identifying a location of the corresponding virtual space;

a point register configured to register a virtual space corresponding to the selected real location as an auction point for enabling users to request a preoccupancy authority of the registered virtual space;

an option determiner configured to determine an auction option for the registered virtual space;

a space manager configured to grant the preoccupancy authority to the auction option for the registered virtual space to a user responsive to a payment of a selling price for the preoccupancy authority of the registered virtual space by the user;

a space setter configured to set, as a messaging space, the registered virtual space of the user having the preoccupancy authority;

a messaging processor configured to provide a location of the messaging space to at least one other user, display a guide user interface for providing a messaging guide to the at least one other user on the messaging space, at least one piece of pre-uploaded content authored by another user being recommended to the at least one other user in association with the guide user interface, collect, as a message for the messaging space, at least one piece of content authored by the at least one other user that shares the messaging space through a coordinate value of the messaging space; and space sharer configured to display the content authored by the at least one other user on the messaging space.

* * * * *